United States Patent
Hata

(10) Patent No.: US 9,712,798 B2
(45) Date of Patent: Jul. 18, 2017

(54) IMAGING APPARATUS AND IMAGE PROCESSING SYSTEM PROCESSING IMAGE BASED ON DETECTION RESULT OF PARTIAL REGION

(71) Applicant: CANON KABUSHIKI KAISHA, Tokyo (JP)

(72) Inventor: Tetsuya Hata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/673,599

(22) Filed: Mar. 30, 2015

(65) Prior Publication Data

US 2015/0281667 A1    Oct. 1, 2015

(30) Foreign Application Priority Data

Apr. 1, 2014   (JP) ................ 2014-075746

(51) Int. Cl.
   *H04N 9/73*    (2006.01)
   *H04N 5/378*   (2011.01)
   (Continued)

(52) U.S. Cl.
   CPC ......... *H04N 9/735* (2013.01); *G06K 9/00228* (2013.01); *G06K 9/00973* (2013.01); *G06K 9/4661* (2013.01); *H04N 5/23219* (2013.01); *H04N 5/23229* (2013.01); *H04N 5/378* (2013.01)

(58) Field of Classification Search
   CPC .. H04N 5/23274; H04N 5/3454; H04N 9/735; H04N 5/378; H04N 5/23219; H04N 5/23229; G06K 9/00228; G06K 9/4661; G06K 9/00973
   See application file for complete search history.

(56) References Cited

U.S. PATENT DOCUMENTS 6,687,386 B1 *  2/2004  Ito ................... G06K 9/00785
                                                     382/103
7,286,174 B1 * 10/2007  Weale ................... H04N 5/335
                                                     250/208.1

(Continued)

FOREIGN PATENT DOCUMENTS

JP     2003-141551 A     5/2003
JP     2007-13415 A      1/2007

*Primary Examiner* — Albert Cutler
(74) *Attorney, Agent, or Firm* — Canon USA, Inc. IP Division

(57) ABSTRACT

An imaging apparatus includes an image sensor, a control unit, a first image processing unit, and a second image processing unit. The image sensor includes a plurality of pixels, each of which includes a photoelectric conversion unit which converts light into an electric charge. The control unit makes a first control line output a signal based on the electric charge of the photoelectric conversion unit to a first signal line, and makes a second control line output a signal based on the electric charge of the photoelectric conversion unit to a second signal line. The first image processing unit performs first image processing for the signal output to the second signal line. The second image processing unit performs second image processing for the signal output to the first signal line based on a result of the first image processing in the first image processing unit.

13 Claims, 8 Drawing Sheets

(51) Int. Cl.
*H04N 5/232* (2006.01)
*G06K 9/00* (2006.01)
*G06K 9/46* (2006.01)

(56) References Cited

U.S. PATENT DOCUMENTS

| | | | |
|---|---|---|---|
| 7,332,703 B2 * | 2/2008 | Shah | H04N 5/2351 |
| | | | 250/208.1 |
| 2004/0141067 A1 * | 7/2004 | Nakayama | H04N 1/0411 |
| | | | 348/222.1 |
| 2006/0146161 A1 * | 7/2006 | Farrier | H01L 27/14603 |
| | | | 348/308 |
| 2007/0171298 A1 * | 7/2007 | Kurane | H04N 5/2353 |
| | | | 348/362 |
| 2008/0291314 A1 * | 11/2008 | Pincenti | H04N 3/1562 |
| | | | 348/311 |
| 2012/0182455 A1 * | 7/2012 | Gomi | H04N 5/23245 |
| | | | 348/311 |
| 2013/0068929 A1 * | 3/2013 | Solhusvik | H01L 27/14634 |
| | | | 250/208.1 |
| 2014/0008520 A1 * | 1/2014 | Raynor | H01L 27/14612 |
| | | | 250/208.1 |
| 2014/0239154 A1 * | 8/2014 | Chen | H04N 5/335 |
| | | | 250/208.1 |
| 2015/0029375 A1 * | 1/2015 | Sugawa | H04N 5/3575 |
| | | | 348/308 |

\* cited by examiner

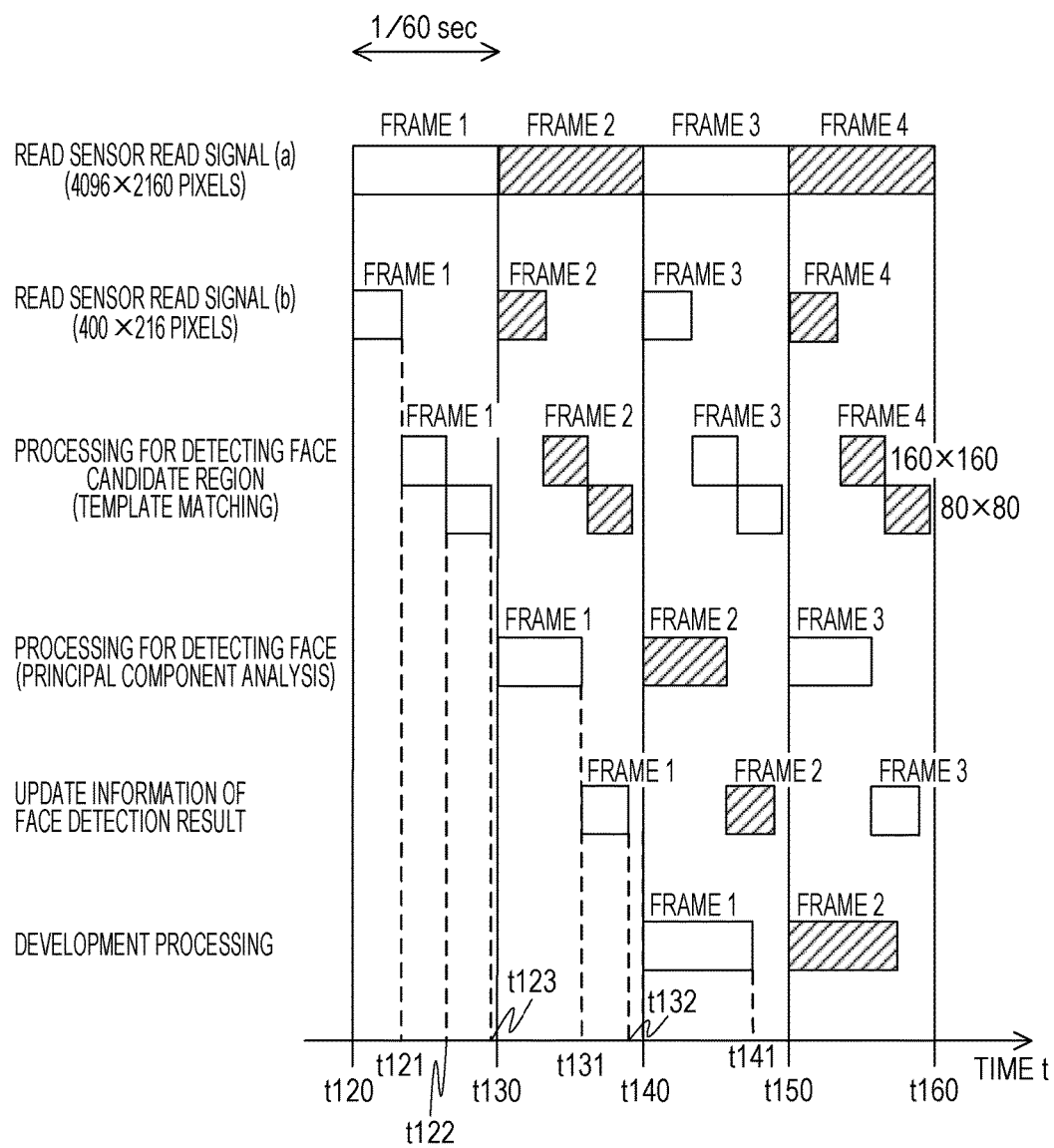

IMAGING APPARATUS AND IMAGE PROCESSING SYSTEM PROCESSING IMAGE BASED ON DETECTION RESULT OF PARTIAL REGION

BACKGROUND

Field of the Disclosure

The present disclosure relates to an imaging apparatus and an image processing system.

Description of the Related Art

In image pickup using an imaging apparatus, a technique is known in which a partial region satisfying specific conditions and a specific object are detected from image signals, and image processing for the image signals is controlled based on the detection result. Japanese Patent Application Laid-Open No. 2003-141551 discloses a method for detecting, from image signals, a human face and the direction of the face. In this technique, the direction of the face is roughly classified using a face detection template for face detection, and then the direction of the face is calculated in detail based on calculation of an eigenvector using principal component analysis. Japanese Patent Application Laid-Open No. 2007-13415 discloses a method for extracting a specular reflection component from image signals based on a dichroic reflection model and estimating a color temperature of a light source in a photographing environment. In this technique, the specular reflection component is extracted using a difference in a pixel value.

According to the technique of Japanese Patent Application Laid-Open No. 2003-141551 described above, a detection method with a small amount of calculation and low accuracy is combined with a detection method with a large amount of calculation and high accuracy, and as a result, information on the face in the image can be acquired with high accuracy. However, when image processing such as correction processing of a color and brightness of the image signal is performed based on the detection result of the face, in the related art, it is necessary to wait for start of the image processing until the detection processing of the face is completed, generating a time lag in the processing. Particularly, when the detection method in two steps, such as in Japanese Patent Application Laid-Open No. 2003-141551 described above, is used, there is a problem of long processing time.

Also in Japanese Patent Application Laid-Open No. 2007-13415, in order to perform white balance correction for an image signal, it is necessary to wait for completion of the processing of extracting the specular reflection component from the image signal, and a time lag in the processing may be generated. In addition, similarly to the detection processing of the face, when the specular reflection component is extracted in combination of rough and high speed processing and processing having high accuracy and a large processing amount, a time lag in the processing may be large.

SUMMARY

An imaging apparatus according to an embodiment of the present invention includes an image sensor, a control unit, a first image processing unit, and a second image processing unit. The image sensor includes a plurality of pixels. Each of the plurality of pixels has a photoelectric conversion unit which converts light into an electric charge. The control unit includes a first control line to output a signal based on the electric charge of the photoelectric conversion unit to a first signal line. The control unit includes a second control line to output a signal based on the electric charge of the photoelectric conversion unit to a second signal line. The first image processing unit is configured to perform first image processing for the signal output to the second signal line. The second image processing unit performs second image processing for the signal output to the first signal line based on a result of the first image processing by the first image processing unit.

Further features of the present invention will become apparent from the following description of exemplary embodiments (with reference to the attached drawings).

BRIEF DESCRIPTION OF THE DRAWINGS

FIG. 8 is a diagram illustrating the flow of the image processing according to the second exemplary embodiment.

DESCRIPTION OF THE EMBODIMENTS

First Exemplary Embodiment

Hereinafter, an imaging apparatus according to a first exemplary embodiment of the present invention will be described with reference to FIGS. 1 to 5C. As the first exemplary embodiment, for example, an imaging apparatus which estimates a light source based on a result of extracting a specular reflection component from image signals, and performs white balance correction will be described.

Figure 1:
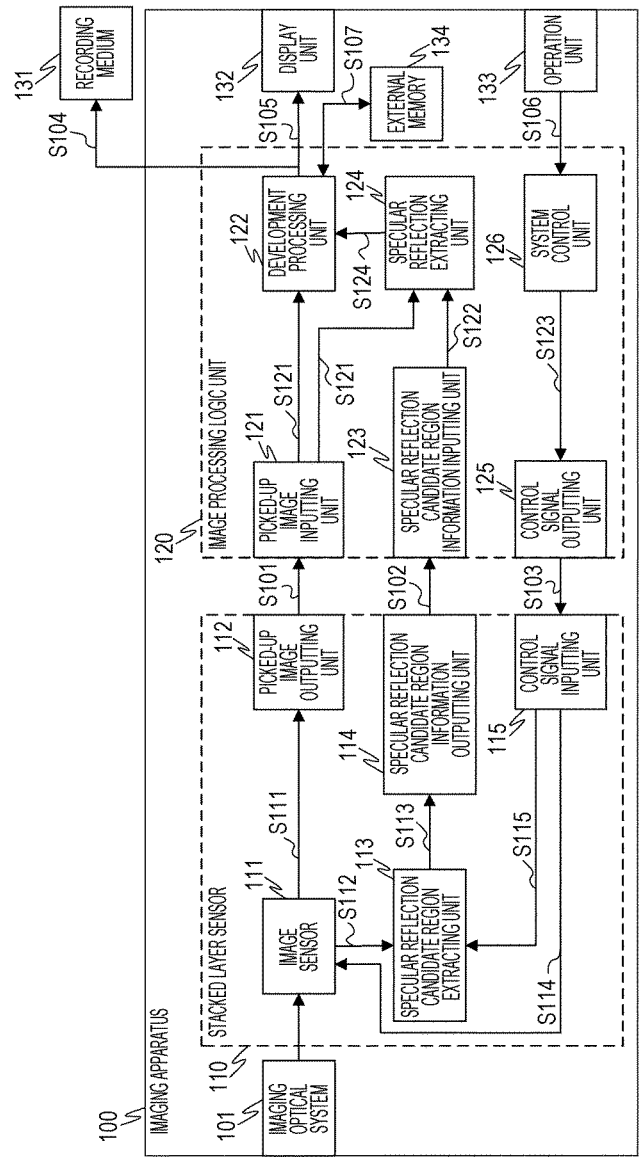
FIG. 1 is a block diagram illustrating a structure of an imaging apparatus according to a first exemplary embodiment.

FIG. 1 is a block diagram illustrating an exemplary structure of the imaging apparatus according to the first exemplary embodiment of the present invention. An imaging apparatus 100 includes an imaging optical system 101, a stacked layer sensor 110, an image processing logic unit 120, a display unit 132, an operation unit 133, and an external memory 134. The stacked layer sensor 110 includes an image sensor 111 which converts an optical image into an image signal, and an image processing unit described later in the same package. The image processing logic unit 120 performs image processing for an image signal output from the stacked layer sensor 110. The recording medium 131 records image data. The display unit 132 presents an image to a user. The operation unit 133 receives an operation from the user. The imaging apparatus of FIG. 1 also includes a picked-up image signal S101, specular reflection candidate region information S102, camera signal processing setting data S103, a recorded image signal S104, a display image signal S105, a user instruction input signal S106, and external memory R/W information S107.

The stacked layer sensor 110 includes an image sensor 111, a picked-up image outputting unit 112, a specular reflection candidate region extracting unit (first image processing unit) 113, a specular reflection candidate region information outputting unit 114, and a control signal inputting unit 115. The image sensor 111 converts an optical image into an image signal. The specular reflection candidate region extracting unit 113 extracts a region which may contain a specular reflection component from image signals. The stacked layer sensor 110 also includes a sensor read signal a S111, a sensor read signal b S112, specular reflection candidate region information S113, a sensor driving setting signal S114, and a specular reflection extraction setting signal S115.

The image processing logic unit 120 includes a picked-up image inputting unit 121, a development processing unit (second image processing unit) 122, a specular reflection candidate region information inputting unit 123, a specular reflection extracting unit 124, a control signal outputting unit 125, and a system control unit 126. The image processing logic unit 120 also includes a development processing input image signal S121, specular reflection candidate region information S122, camera signal processing setting information S123, and white balance gain information S124.

Figure 2:
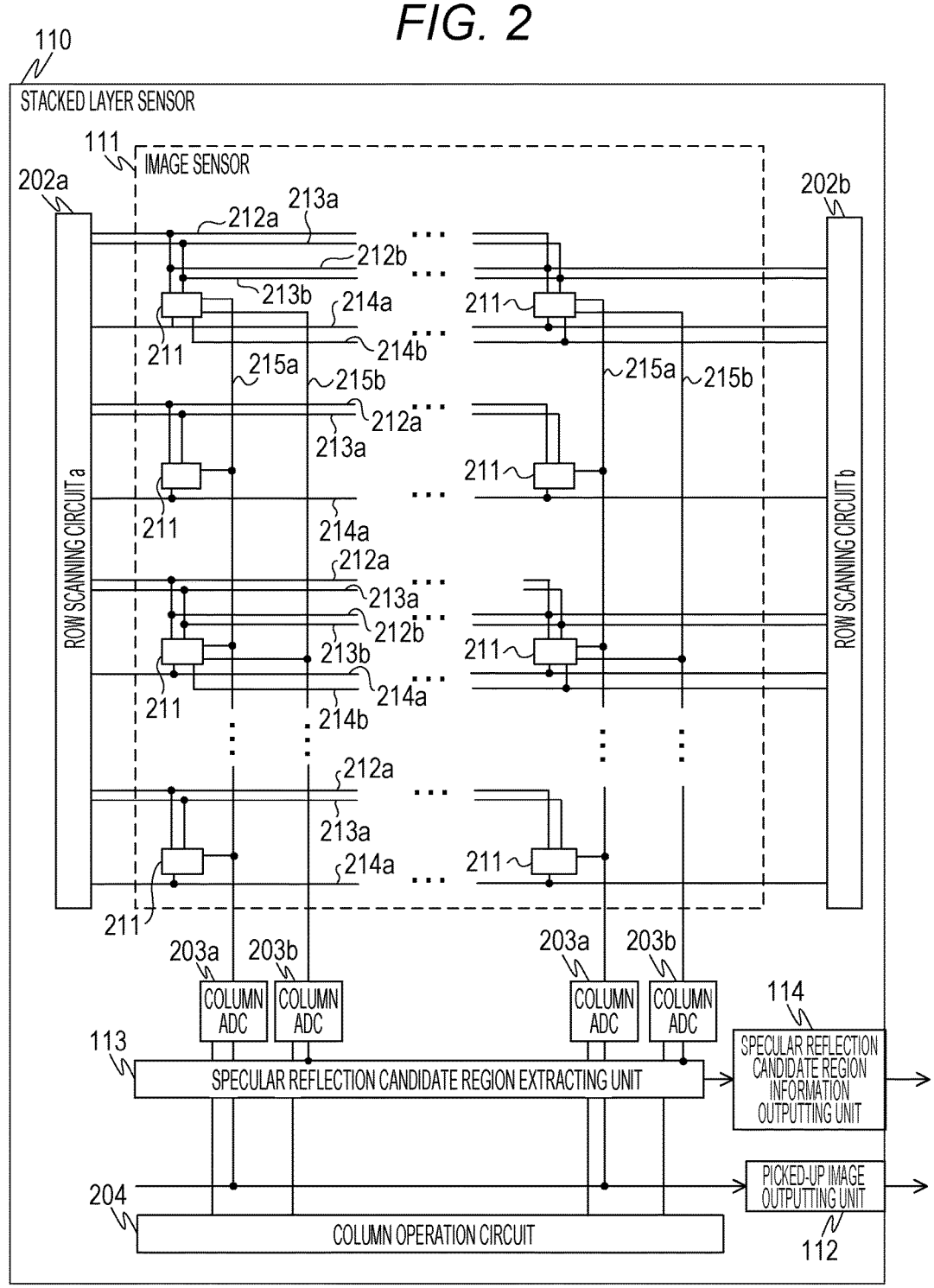
FIG. 2 is a block diagram illustrating a structure of a stacked layer sensor according to the first exemplary embodiment.

FIG. 2 is a block diagram illustrating an exemplary structure of the stacked layer sensor 110. The stacked layer sensor 110 includes a row scanning circuit (control unit) a 202a and a row scanning circuit (control unit) b 202b, for selecting an image signal to be output to the picked-up image outputting unit 112 and the specular reflection candidate region extracting unit 113, respectively. The stacked layer sensor 110 also includes column analog digital converters (column ADCs) 203a and 203b which convert an analog signal into a digital signal, and a column operation circuit 204 which scans each column.

The image sensor 111 includes a plurality of pixels 211 arranged in a two dimensional matrix form. The image sensor 111 includes a transfer signal line a 212a, a reset signal line a 213a, a row selection signal line a 214a. The row selection signal line a 214a reads an image signal from the pixel 211 in accordance with control by the row scanning circuit 202a. The read image signal is output to a column signal line 215a as described later. The image sensor 111 also includes a transfer signal line b 212b, a reset signal line b 213b, and a row selection signal line b 214b. The row selection signal line b 214b reads an image signal from the pixel 211 in accordance with control by the row scanning circuit 202b. The read image signal is output to a column signal line 215b as described later.

A column signal line a 215a outputs the sensor read signal S111 to the picked-up image outputting unit 112 via the column ADC 203a. A column signal line b 215b outputs the sensor read signal S112 to the specular reflection candidate region extracting unit 113 via the column ADC 203b. As illustrated in FIG. 2, the transfer signal line 212a, the reset signal line 213a, the row selection signal line 214a, and the column signal line 215a are connected to all the pixels 211. Meanwhile, the transfer signal line 212b, the reset signal line 213b, the row selection signal line 214b, and the column signal line 215b are connected to some of the pixels 211. That is, the sensor read signal S112 output to the specular reflection candidate region extracting unit 113 has thinned pixels with respect to the sensor read signal S111 output to the picked-up image outputting unit 112. For example, the sensor read signal S111 has horizontal 4096 pixels and vertical 2160 pixels. The sensor read signal b (S112) has pixels thinned into horizontal 400 pixels and vertical 216 pixels.

The row scanning circuits 202a and 202b, the image sensor 111, the column ADCs 203a and 203b, the specular reflection candidate region extracting unit 113, the column operation circuit 204, the specular reflection candidate region information outputting unit 114, and the picked-up image outputting unit 112 are formed in the same semiconductor chip. The image sensor 111 and the specular reflection candidate region extracting unit 113 are stacked on each other to be disposed. That is, the image sensor 111 is disposed on a light entrance side, and the specular reflection candidate region extracting unit 113 is disposed on the back side thereof. The image sensor 111 and the specular reflection candidate region extracting unit 113 are electrically connected to each other. As a result, a speed at which the image sensor 111 outputs an image signal to the specular reflection candidate region extracting unit 113 can be higher than a speed at which the image sensor 111 outputs an image signal to the development processing unit 122.

Figure 3:
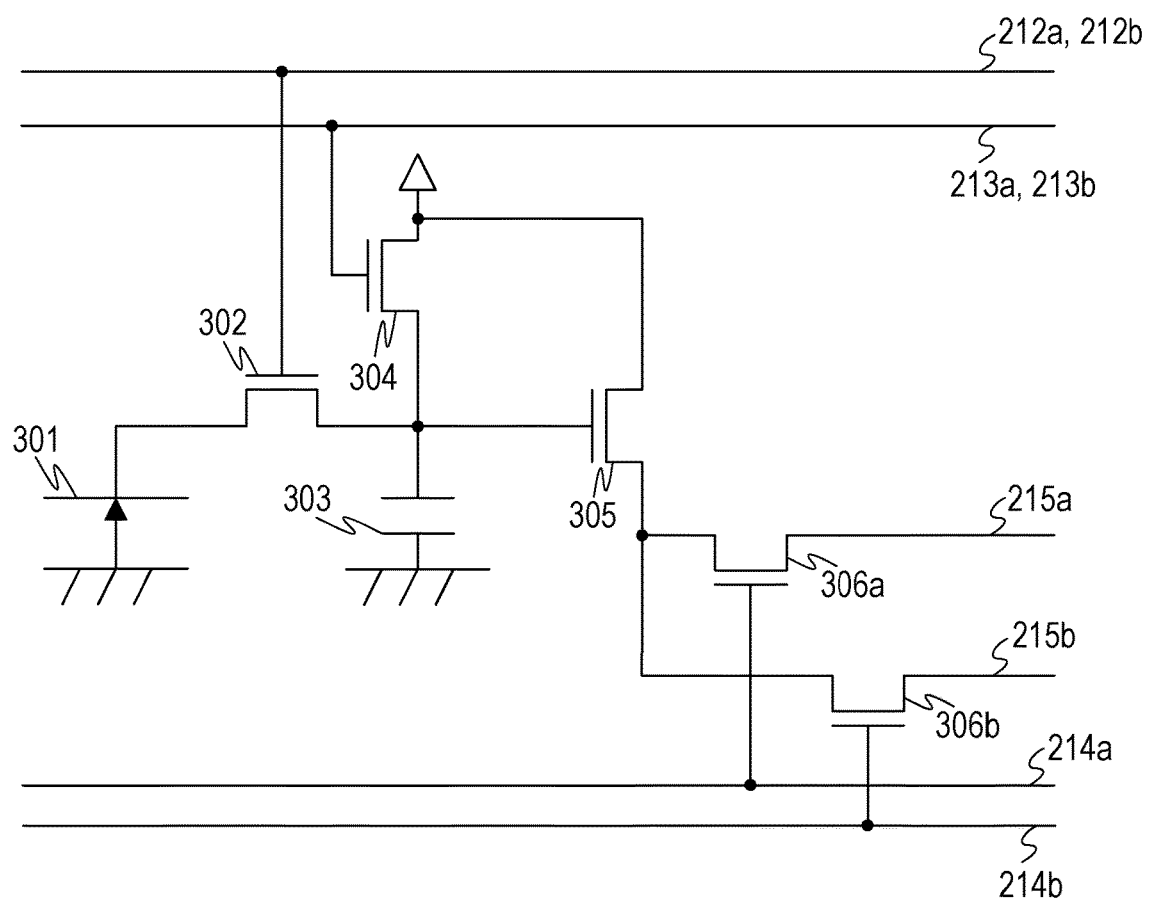
FIG. 3 is a diagram illustrating a structure of a pixel unit of the stacked layer sensor according to the first exemplary embodiment.

FIG. 3 is a circuit diagram illustrating an exemplary structure of the pixel 211. The pixel 211 includes a photodiode 301, a transfer transistor 302, a floating diffusion (FD) 303, a reset transistor 304, an amplifying transistor 305, and selecting transistors 306a and 306b. The photodiode 301 is a photoelectric conversion unit which converts light into an electric charge, in which the anode is grounded and the cathode is connected to the source of the transfer transistor 302. The transfer signal lines 212a and 212b are connected to the gate of the transfer transistor 302. As a result, when the transfer transistor 302 is turned on by the transfer signal line 212a or 212b, an electric charge accumulated in the photodiode 301 is transferred to the FD303 to be accumulated in the FD303. In the amplifying transistor 305, a power source voltage Vdd is applied to the drain, and the gate is connected to the FD303. The amplifying transistor 305 amplifies the electric charge accumulated in the FD303 to convert the electric charge into a voltage signal.

The selecting transistor 306a is disposed between the source of the amplifying transistor 305 and the column signal line 215a. The gate of the selecting transistor 306a is connected to the row selection signal line 214a. As a result, when the selecting transistor 306a is turned on by the row selection signal line 214a, a voltage signal corresponding to a voltage of the FD303 is output to the column signal line 215a.

Meanwhile, the selecting transistor 306b is disposed between the source of the amplifying transistor 305 and the column signal line 215b. The gate of the selecting transistor 306b is connected to the row selection signal line 214b. As a result, when the selecting transistor 306b is turned on by the row selection signal line 214b, a voltage signal corresponding to the voltage of the FD303 is output to the column signal line 215b.

In the reset transistor 304, the gate is connected to the reset signal lines 213a and 213b, the drain is connected to the node of the power source voltage Vdd, and the source is connected to the FD303. As a result, when the reset transistor 304 is turned on by the reset signal line 213a or 213b, the voltage of the FD303 is reset to the power source voltage Vdd. The sensor read signal S111 is read by scanning control of the row scanning circuit 202a. The sensor read signal S112 is read by scanning control of the row scanning circuit 202b.

Figure 4:
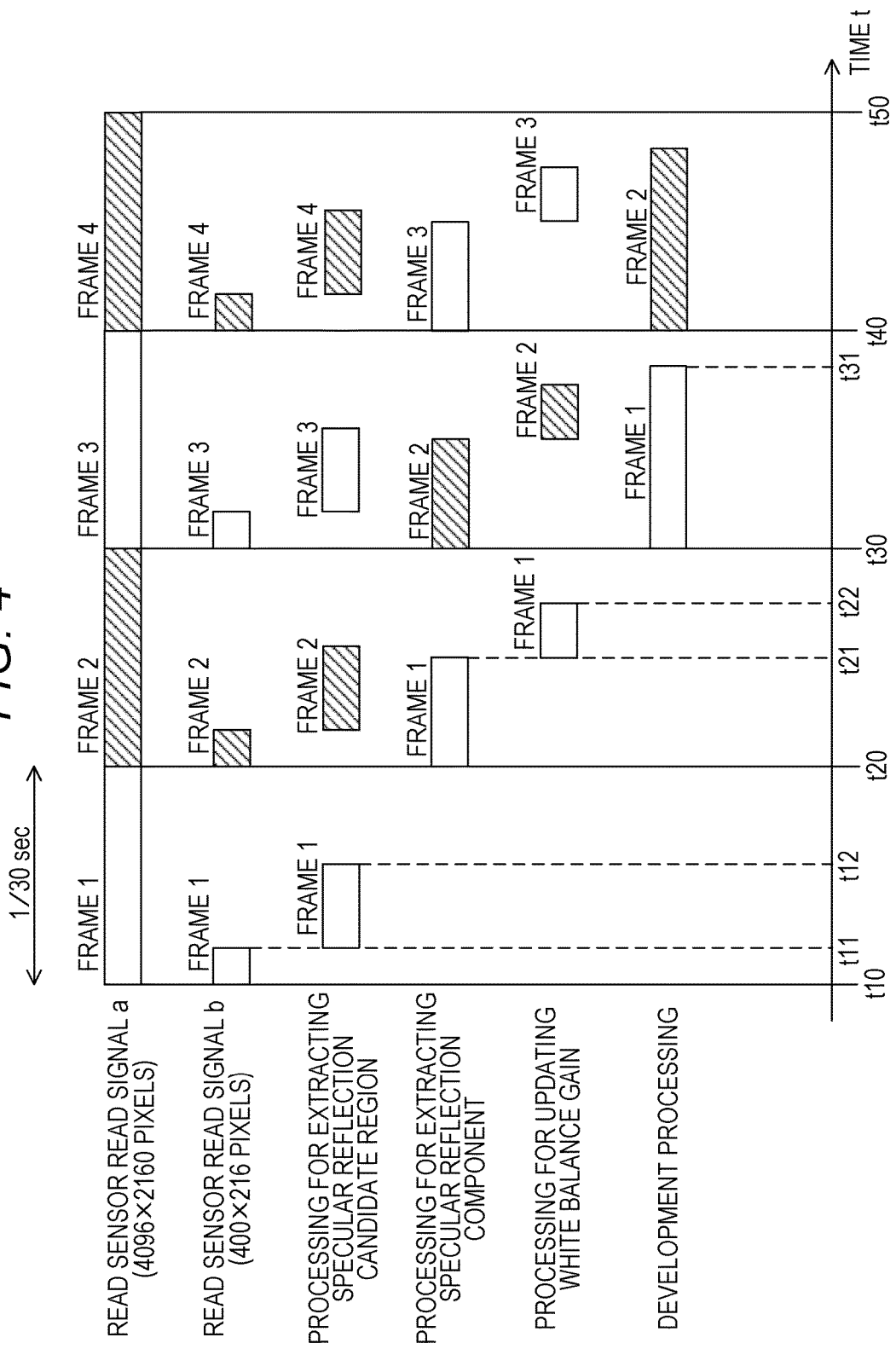
FIG. 4 is a diagram illustrating the flow of image processing according to the first exemplary embodiment.

With reference to FIG. 4, read of an image signal in the imaging apparatus 100 and a flow of image processing for the read image signal will be described. FIG. 4 illustrates operation timing of the imaging apparatus 100 when a moving image signal is read at a driving period of 1/30 second for image processing.

The sensor read signal a (S111) read in the image sensor 111 is output to the outside of the stacked layer sensor 110 as the picked-up image signal S101 by the picked-up image outputting unit 112. The picked-up image signal S101 is received by the picked-up image inputting unit 121 to be supplied to the development processing unit 122 as the development processing input image signal S121.

As illustrated in FIG. 4, read of a first frame image signal (frame 1) of the sensor read signal a (S111) is started at time t10 and terminated at time t20. Then, a subsequent frame image signal (frame 2) is read between the time t20 and t30. Thereafter, a frame image signal is read periodically.

The development processing unit 122 is a second image processing unit to perform various correction processing (second image processing) such as gamma correction and color correction to the development processing input image signal S121. The development processing unit 122 performs white balance correction (second image processing) in accordance with white balance gain calculated by a method described later. Image processing in the development processing unit 122 is performed via external memory R/W information S107 with the external memory 134 between the time t30 and t31 in FIG. 4.

That is, an image signal corresponding to the first frame of the moving image read between the time t10 and t20 is output from the development processing unit 122 at the time t31 delayed by two frames to be used for recording image data in the recording medium 131 or displaying an image in the display unit 132.

Meanwhile, the sensor read signal b (S112) is output to the specular reflection candidate region extracting unit 113 between the time t10 and t11. As illustrated in FIG. 4, read of the sensor read signal b (S112) is completed in shorter time than read of the sensor read signal a (S111). This is because the sensor read signal b (S112) has the thinned number of pixels, and the image sensor 111 and the specular reflection candidate region extracting unit 113 are connected to each other by the stacked layer structure.

Figure 5A:
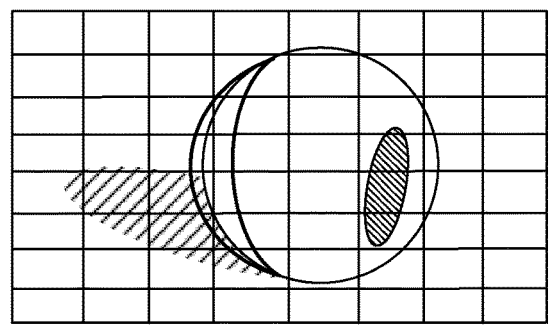
FIGS. 5A to 5C are diagrams illustrating a method for extracting a specular reflection component according to the first exemplary embodiment.
Figure 5B:
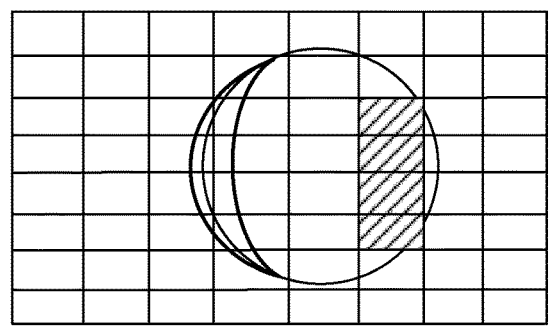

Next, the specular reflection candidate region extracting unit 113 is a first image processing unit to perform first image processing of extracting, from the sensor read signal b (S112), a specular reflection candidate region in which specular reflection may occur on the surface of an object. Specific methods therefor will be described with reference to FIGS. 5A to 5C. FIGS. 5A and 5B illustrate an image signal divided into appropriately sized blocks. In FIGS. 5A and 5B, the image signal is divided into 8×8=64 blocks. It is assumed that the hatching region on the surface of the object indicates a region in which specular reflection occurs. The specular reflection candidate region extracting unit 113 extracts, from the divided blocks, a block which may include a region in which specular reflection occurs to output position information thereof as the specular reflection candidate region information S113. It is considered that the region in which specular reflection occurs has higher brightness of the image signal than a region therearound in which diffusion reflection occurs. As a result, the specular reflection candidate region extracting unit 113 calculates average brightness in each block, and searches for and extracts a block having average brightness higher than that of a block therearound. Under this condition, a plurality of blocks which are determined to have a high possibility of occurrence of specular reflection may exist. In this case, a plurality of information items is also output as the specular reflection candidate region information S113. In FIG. 5B, the extracted block is indicated by the oblique lines. Processing of extracting the above-described specular reflection candidate region is performed between the time t11 and t12.

The specular reflection candidate region information S113 is output to the specular reflection candidate region information inputting unit 123 of the image processing logic unit 120 from the specular reflection candidate region information outputting unit 114.

Next, processing of the specular reflection extracting unit 124 will be described. By extracting a reflection component corresponding to specular reflection from the development processing input image signal S121 input via the picked-up image inputting unit 121, the specular reflection extracting unit 124 estimates a color of a light source. A region corresponding to the specular reflection candidate region information S122 in the development processing input image signal S121 is used to reduce processing time.

Figure 5C:
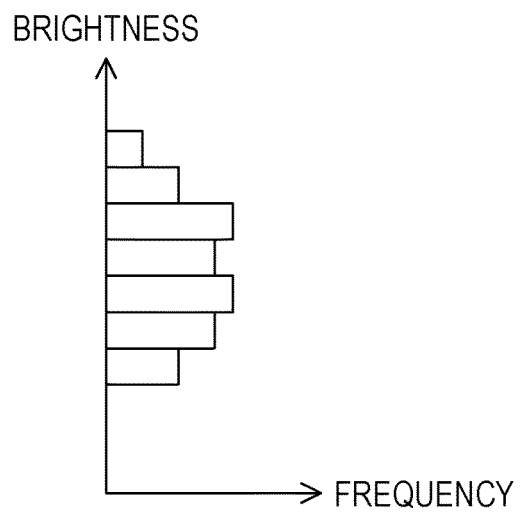

The processing will be described with reference to FIGS. 5B and 5C. The specular reflection extracting unit 124 divides the image signal into a plurality of blocks similarly to the specular reflection candidate region extracting unit 113. The number of division and the position of division are set to be the same as those of the specular reflection candidate region extracting unit 113. In the present exemplary embodiment, the specular reflection extracting unit 124 divides the image signal into 8×8 blocks. The specular reflection extracting unit 124 generates brightness histogram for a pixel in a block included in the specular reflection candidate region information S122 to extract a specular reflection component. FIG. 5C illustrates an example of brightness histogram generated by the specular reflection extracting unit 124. The vertical axis of FIG. 5C indicates a brightness signal Y of each pixel. The horizontal axis of FIG. 5C indicates a frequency indicating the number of pixels included in a period of each brightness signal Y. As described above, it is considered that the region in which specular reflection occurs has higher brightness than a region in which specular reflection does not occur. Therefore, in the brightness histogram in FIG. 5C, it is considered that a pixel included in a period of a high brightness signal Y contains many specular reflection components. As a result, in the brightness histogram, by calculating a difference in the pixel value between the pixel included in a period corresponding to the high brightness signal and a pixel included in a period corresponding to a lower brightness signal, a specular reflection signal can be extracted. The specular reflection component extracted at this time indicates a color of a light source in a photographing environment. Therefore, the specular reflection extracting unit 124 can calculate white balance gain suitable for the photographing environment based on the extracted specular reflection component. The specular reflection extracting unit 124 outputs the calculated white balance gain to the development processing unit 122. The above-described processing is performed between the time t20 and t21 in the sequence of FIG. 4. Between the time t21 and t22, the white balance gain information S124 is updated to the development processing unit 122 by the system control unit 126. As described above, between the time t30 and t31 in FIG. 4, the development processing unit 122 can perform image processing including white balance correction.

As described above, the imaging apparatus 100 of the present exemplary embodiment includes the stacked layer sensor 110 in which the image sensor 111 and the image processing unit are integrated. The specular reflection candidate region extracting unit (image processing unit) 113 in the stacked layer sensor 110 extracts a region having a high possibility of occurrence of specular reflection. Then, the specular reflection extracting unit (image processing unit) 124 outside the stacked layer sensor 110 extracts a specular reflection component with higher accuracy.

According to the present exemplary embodiment, processing from the start to the completion of read of the sensor read signal b in FIG. 4 and subsequent processing of extracting a region having a high possibility of occurrence of specular reflection based on a brightness signal for each block are completed during a period from the start to the completion of read of the sensor read signal a. In cases other than the present exemplary embodiment, first, a thinned image corresponding to the sensor read signal b needs to be generated based on the sensor read signal a, and then, extracting processing with a brightness value for each block needs to be performed. As a result, it takes much time for processing. According to the present exemplary embodiment, on the other hand, the above-described time can be reduced.

In the present exemplary embodiment, a region having a high possibility of containing the specular reflection component is detected using brightness information for each block, and the specular reflection component is extracted using brightness histogram for each pixel. However, the methods for detecting and extracting specular reflection are not limited thereto. For example, from the read image signals, a partial region having a brightness value higher than that of a region therearound may be detected as a region having a high possibility of containing the specular reflection component. In addition, by calculating a difference in the pixel value for each pixel and extracting a difference value corresponding to a representative color of a light source stored in advance from the calculated difference values, the specular reflection component may be extracted. That is, any method may be used as long as processing of detecting a region having a high possibility of containing the specular reflection component and processing of extracting the specular reflection component based on the image signal are performed.

In the present exemplary embodiment, the case where the stacked layer sensor 110 outputs position information of the region having a high possibility of containing the specular reflection component has been described. However, information output from the stacked layer sensor 110 is not limited thereto. For example, the stacked layer sensor 110 may output information indicating whether the region having a high possibility of containing the specular reflection component exists. In this case, when the region having a high possibility of containing the specular reflection component exists, the development processing unit 122 performs white balance processing based on the detection of the specular reflection. When the region does not exist, the development processing unit 122 performs white balance processing based on the detection of an achromatic color region of the image signal. As a result, when appropriate white balance correction cannot be performed by the white balance processing based on the detection of the specular reflection, wasteful processing can be avoided, and it is possible to reduce the total processing time.

As a result of outputting from the stacked layer sensor 110, an image signal in the region having a high possibility of containing the specular reflection component may be output. In this case, the specular reflection extracting unit 124 is only required to generate a brightness histogram for an image signal in the output partial region to extract the specular reflection component. As a result, the specular reflection extracting unit 124 can calculate white balance gain without waiting for completion of read of the image signal with high resolution to the development processing unit 122 to thereby reduce the total processing time.

That is, as long as the stacked layer sensor 110 outputs information indicating a result of detecting the region having a high possibility of containing the specular reflection component, information output from the stacked layer sensor 110 may have any format. In the present exemplary embodiment, the case of using the stacked layer sensor 110 including the image sensor 111 and the specular reflection candidate region extracting unit (image processing unit) 113 connected to each other by the stacked layer structure has been described. However, the structure of the sensor is not limited to the stacked layer sensor 110. That is, any sensor in which the pixel 211, the row scanning circuits 202*a* and 202*b*, and the specular reflection candidate region extracting unit 113 are included as an integrated type package may be used.

In the present exemplary embodiment, the imaging apparatus 100 including the stacked layer sensor 110 and the image processing logic unit 120 has been described. However, the present exemplary embodiment is not limited to the imaging apparatus. For example, an image processing system including an imaging apparatus provided with the stacked layer sensor 110, the specular reflection candidate region extracting unit 113, and a recording unit, and an image processing apparatus provided with a read unit of a recorded signal and the image processing logic unit 120 may be used. In this case, the recording unit of the imaging apparatus only needs to record an image signal output from the image sensor 111 and information of an image region having a high possibility of containing the specular reflection component. In this way, the image processing logic unit 120 can reduce the total processing time even when the image processing is performed outside the imaging apparatus.

Second Exemplary Embodiment

Figure 6:
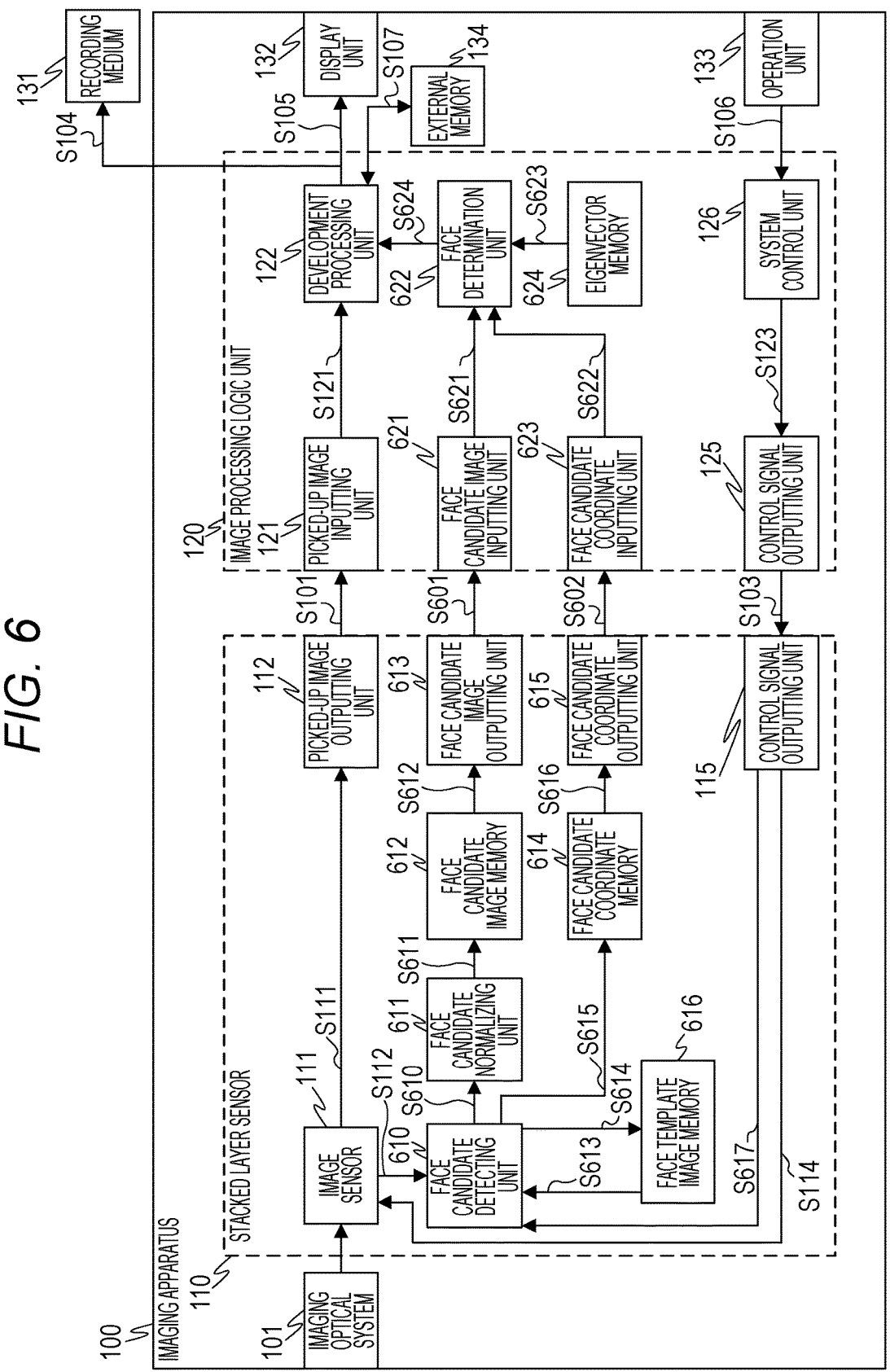
FIG. 6 is a block diagram illustrating a structure of an imaging apparatus according to a second exemplary embodiment.

Next, as a second exemplary embodiment of the present invention, for example, an imaging apparatus which detects a face from image signals to control image processing based on a result of the detection will be described. FIG. 6 is a block diagram illustrating an exemplary structure of the imaging apparatus according to the second exemplary embodiment of the present invention. The same reference signs are given to similar components to those in the first exemplary embodiment illustrated in FIG. 1, and description thereof will be omitted. Hereinafter, differences between the present exemplary embodiment and the first exemplary embodiment will be described.

The imaging apparatus in FIG. 6 includes face candidate coordinate information S601 and face candidate image information S602. The imaging apparatus also includes a face candidate detecting unit 610, a face candidate normalizing unit 611, a face candidate image memory 612, a face candidate image outputting unit 613, a face candidate coordinate memory 614, a face candidate coordinate outputting unit 615, and a face template image memory 616. The imaging apparatus also includes individual face candidate image information S610, normalized face candidate image information S611, face candidate image information S612, face template image information S613, face template setting information S614, individual face candidate coordinate information S615, and face candidate coordinate information S616.

An image processing logic unit 120 includes a face candidate image inputting unit 621, a face determination unit 622, a face candidate coordinate inputting unit 623, and an eigenvector memory 624. The image processing logic unit 120 also includes face candidate image information S621, face candidate coordinate information S622, eigenvector information S623, and face determination result information S624.

Since an image sensor 111 has the structure described in the first exemplary embodiment, detailed description thereof will be omitted. As in the first exemplary embodiment, a sensor read signal a (S111) is an image signal of all the pixels of the image sensor 111. A sensor read signal b (S112) is an image signal having thinned pixels with respect to all the pixels of the image sensor 111. For example, the sensor read signal a (S111) has horizontal 4096 pixels and vertical 2160 pixels. The sensor read signal b (S112) has pixels thinned into horizontal 400 pixels and vertical 216 pixels.

Figure 7:
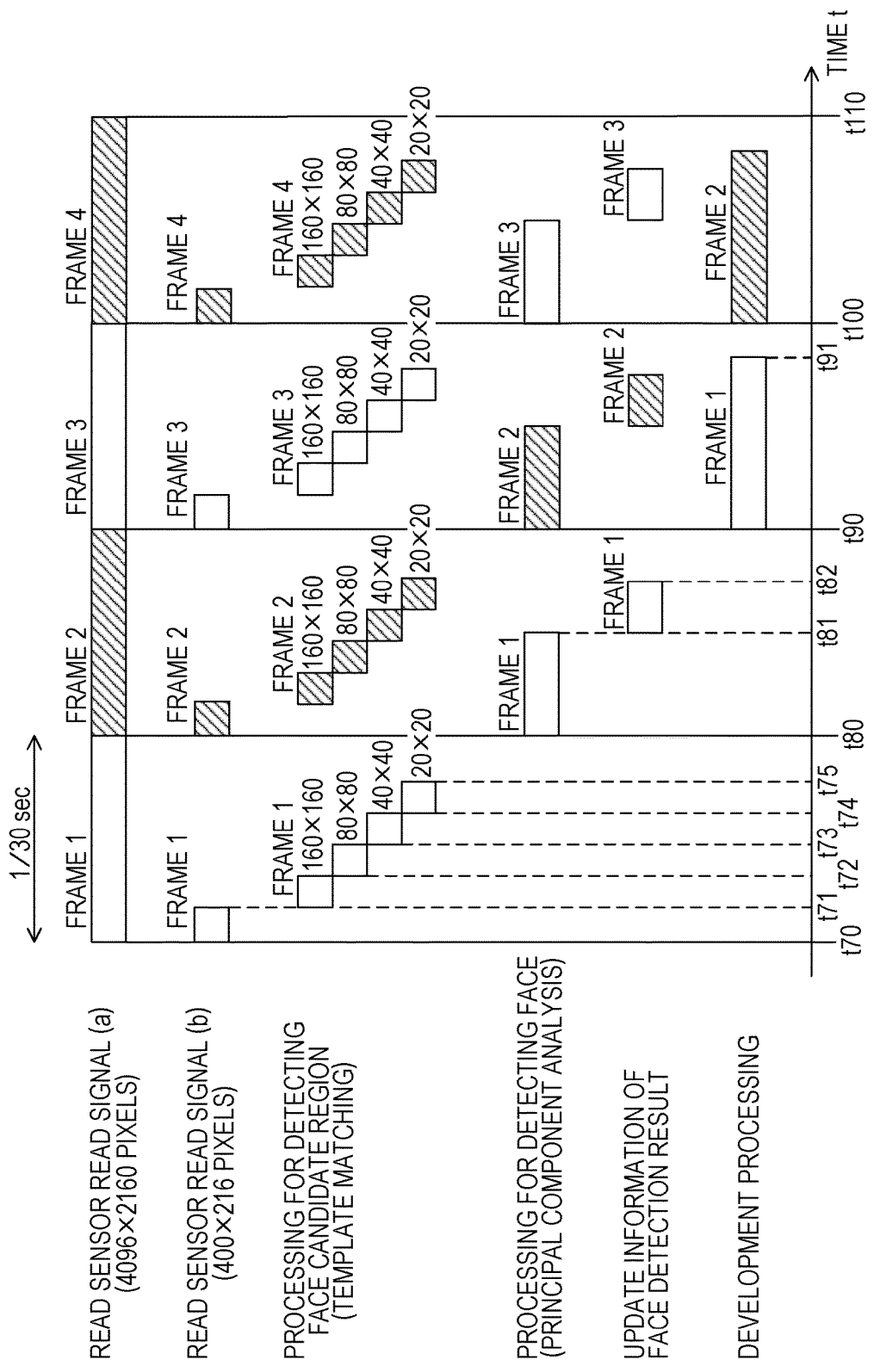
FIG. 7 is a diagram illustrating the flow of image processing according to the second exemplary embodiment.

Next, with reference to FIGS. 7 and 8, operation timing of the imaging apparatus according to the second exemplary embodiment of the present invention will be described. FIG. 7 illustrates operation timing during moving image capturing operation at a period of 1/30 second. FIG. 8 illustrates operation timing during moving image capturing operation at a period of 1/60 second.

The sensor read signal a (S111) is output to the outside of the stacked layer sensor 110 as the picked-up image signal S101 by the picked-up image outputting unit 112. The picked-up image signal S101 is received by the image processing logic unit 120 from the picked-up image inputting unit 121 to be supplied to the development processing unit 122 as the development processing input image signal S121. As illustrated in FIG. 7, read of the sensor read signal a (S111) is started at the time t70, and terminated at the time t80. Then, a moving image is output periodically between the time t90 and t100.

Based on the face determination result information S624, the development processing unit 122 performs image processing including face region image processing, such as skin color correction processing for a face region of an object and noise suppression processing specialized for the face region of the object. The image processing is performed using the external memory 134 via the external memory R/W information S107. Between the time t90 and t91 in FIG. 7, the display image signal S105 and the recorded image signal S104 are output from the development processing unit 122. That is, an image of the first frame of the sensor read signal a (S111) read between the time t70 and t80 is output from the development processing unit 122 between the time t90 and t91 (delayed by two frames). Pointer information indicating the face region of the object is superimposed to the display image signal S105 to be displayed in the display unit 132. The recorded image signal S104 is recorded in the recording medium 131.

Meanwhile, the sensor read signal b (S112) is input to the face candidate detecting unit 610. The sensor read signal b (S112) is thinned into horizontal 400 pixels and vertical 216 pixels, and thus read is completed between the time t70 and t71 in FIG. 7.

In the face template image memory 616, a face template image is recorded in advance in a plurality of face sizes. A face as an object changes in size variously depending on the condition during photographing. Therefore, the face template image is also preferably recorded in a plurality of sizes. For example, for each of the horizontal pixel and the vertical pixel, four types of pixels (160 pixels, 80 pixels, 40 pixels, and 20 pixels) are recorded. From the face template setting information S614, it is possible to designate which face size of the face template image is to be read as the face template image information S613.

Using the face template image information S613 in a designated face size, the face candidate detecting unit 610 searches all the field angles of the sensor read signal b (S112) for a partial region having high correlation with the face template image information S613 in the designated face size. That is, the face candidate detecting unit 610 extracts a partial region image in the same size as the face template image information S613 in the designated face size from the sensor read signal b (S112) while shifting the partial region. By comparison of a correlation coefficient or a difference between the partial region and the face template image information S613 in the designated face size, the face candidate detecting unit 610 roughly and correlatedly rates whether a possibility of existence of the face in the partial region is high or low. As described above, the face as the object changes in size variously depending on the condition during photographing. Therefore, search processing is desirably performed for all the face template images in the plurality of sizes recorded in advance.

Therefore, as illustrated in FIG. 7, between the time t71 and t72, the face candidate detecting unit 610 performs search processing to the face template image information S613 having horizontal 160 pixels and vertical 160 pixels. Between the time t72 and t73, the face candidate detecting unit 610 performs search processing to the face template image information S613 having horizontal 80 pixels and vertical 80 pixels. Between the time t73 and t74, the face candidate detecting unit 610 performs search processing to the face template image information S613 having horizontal 40 pixels and vertical 40 pixels. Between the time t74 and t75, the face candidate detecting unit 610 performs search processing to the face template image information S613 having horizontal 20 pixels and vertical 20 pixels.

If it is determined by the above-described search processing that the possibility of existence of the face is high, the face candidate detecting unit 610 generates the individual face candidate coordinate information S615 including the face position and size information from the information of the partial region compared with the face template image information S613 in the designated face size. The face candidate detecting unit 610 stores the individual face candidate coordinate information S615 in the face candidate coordinate memory 614. A plurality of partial regions may be determined to have a high possibility of existence of the face. Therefore, a plurality of pieces of individual face candidate coordinate information S615 may also exist.

In addition, the face candidate detecting unit 610 cuts out the partial region image compared with the face template image information S613 in the designated face size, and generates the individual face candidate image information S610 to output the information to the face candidate normalizing unit 611. The individual face candidate image information S610 has a plurality of image sizes in association with the face template image information S613 in the designated face size. As a result, the face candidate normalizing unit 611 performs normalization processing to unify the image sizes to a common image size. For example, the face candidate normalizing unit 611 performs reduction processing such that each of the horizontal and vertical pixels has 20 pixels in size. In this way, the normalized face candidate image information S611 is generated to be stored in the face candidate image memory 612 as a face candidate image having the horizontal 20 pixels and the vertical 20 pixels common in size.

Normalization processing of the face candidate normalizing unit 611 is performed between the time t71 and t72, between the time t72 and t73, between the time t73 and t74, and between the time t74 and t75 in FIG. 7. As illustrated in FIG. 7, processing from the start to the completion of read of the sensor read signal b (S112), and subsequent template matching processing by the face template images in four face sizes are completed during a period from the start to the completion of read of the sensor read signal a (S111).

Next, the face candidate coordinate memory 614 and the face candidate image memory 612 output the recorded face candidate coordinate information S616 and face candidate image information S612. At the time t80 in FIG. 7, the face candidate coordinate information S616 and the face candidate image information S612 are output to the outside of the stacked layer sensor 110 from the face candidate coordinate outputting unit 615 and the face candidate image outputting unit 613 as the face candidate coordinate information S602 and the face candidate image information S601, respectively. The face candidate coordinate information S602 and the face candidate image information S601 are input to the image processing logic unit 120 via the face candidate coordinate inputting unit 623 and the face candidate image inputting unit 621, respectively.

The face candidate coordinate inputting unit 623 outputs the face candidate coordinate information S602 to the face determination unit 622 as the face candidate coordinate information S622. The face candidate image inputting unit 621 outputs the face candidate image information S601 to the face determination unit 622 as the face candidate image information S621. As described above, the face candidate image information S621 is determined by rough rating to have a high possibility of being the face by a correlation coefficient or a difference between the face template image information S613 and the partial region image in the same size. Therefore, the accuracy rate is not so high.

In order to raise the accuracy rate, the eigenvector memory 624 records in advance the eigenvector information S623 of the face extracted by principal component analysis as data indicating a feature amount of a face image with accuracy. The face determination unit 622 finally performs face determination to indicate face or not by checking the face candidate image information S621 with the eigenvector information S623 of the face. The eigenvector information S623 of the face is recoded in advance in the eigenvector memory 624, output as the eigenvector information S623, and input to the face determination unit 622. As described above, the face determination unit 622 performs face determination processing by principal component analysis and finally performs face determination to indicate face or not. The face determination unit 622 outputs the face determination result information S624 to the development processing unit 122 as a result of the face determination.

Between the time t80 and t81 in FIG. 7, the face determination unit 622 performs final face determination processing for the face candidate image information S621. Between the time t81 and t82 in FIG. 7, setting parameters of various correction processing controlled based on the face determination result information S624 in the development processing unit 122 are updated. As described above, between the time t90 and t91 in FIG. 7, by updating the setting parameters in the development processing unit 122, the development processing unit 122 performs image processing including face region image processing, such as skin color correction processing for a face region of an object and noise suppression processing specialized for the face region of the object.

In the present exemplary embodiment, processing from the start to the completion of read of the sensor read signal b (S112), and subsequent template matching processing by the face template images in four face sizes are completed during a period from the start to the completion of read of the sensor read signal a (S111).

In cases other than the present exemplary embodiment, first, a thinned image corresponding to the sensor read signal b (S112) needs to be generated based on the sensor read signal a (S111). Furthermore, then, template matching processing by the face template images in four face sizes needs to be performed. As a result, it takes much time. According to the present exemplary embodiment, the above-described time is considerably reduced.

Next, a case where a user has changed control parameters for the imaging apparatus 100 of the present exemplary embodiment will be described. Here, it is assumed that the user has input an instruction to set a frame rate during moving image capturing from a period of 1/30 second (FIG. 7) to a period of 1/60 second (FIG. 8) which is a double speed frame rate via the operation unit 133.

The system control unit 126 sets the camera signal processing setting information S123 to a period of 1/60 second to output the camera signal processing setting information S123 to the outside of the image processing logic unit 120 via the control signal outputting unit 125 as the camera signal processing setting data S103. The control signal inputting unit 115 of the stacked layer sensor 110 inputs the camera signal processing setting data S103. The control signal inputting unit 115 outputs a face template setting signal S617 to the face candidate detecting unit 610 and the sensor driving setting signal S114 to the image sensor 111. The sensor driving setting signal S114 is a setting signal which changes setting for thinning the sensor read signal b (S112) generated in the image sensor 111. The face template setting signal S617 is a setting signal which determines a lower limit of the face size to perform template matching processing among the above-described face template images in four face sizes.

In the present exemplary embodiment, even when the frame rate is set to a period of 1/60 second which is a double speed frame rate, a period of processing from the start to the completion of read of the sensor read signal b (S112), and subsequent template matching processing by the face template images in four face sizes is reduced. During the period, in order to complete the above-described processing during the period from the start to the completion of the sensor read signal a (S111), the following change is made.

That is, first, by the sensor driving setting signal S114, setting for thinning the sensor read signal b (S112) is performed so that horizontal 400 pixels and vertical 216 pixels are further thinned into horizontal 320 pixels and vertical 180 pixels. As a result, a period from the time t120 to t121 in FIG. 8, which is the period from the start to the termination of read of the sensor read signal b (S112), is further reduced.

In addition, by setting the face template setting signal S617, the image size of the face template used for template matching processing is limited to the face template image having horizontal 160 pixels and vertical 160 pixels, and the face template image having horizontal 80 pixels and vertical 80 pixels. Between the time t121 and t122 in FIG. 8, the face candidate detecting unit 610 performs search processing to the face template image having horizontal 160 pixels and vertical 160 pixels. Between the time t122 and t123, the face candidate detecting unit 610 performs search processing to the face template image having horizontal 80 pixels and vertical 80 pixels to terminate the template matching processing.

In this way, the template matching processing time of the face candidate detecting unit 610 is reduced to ½. In addition, the period from the time t120 to t121 in FIG. 8, which is the period from the start to the termination of read of the sensor read signal b (S112), is reduced. Processing from the start to the completion of read of the sensor read signal a (S111) is performed in 1/60 second (double speed). Even in this case, processing from the start to the completion of read of the sensor read signal b (S112) and subsequent template matching processing can be completed during a period from the start to the completion of read of the sensor read signal a (S111).

As described above, according to the present exemplary embodiment, for the region of all the pixels of the image sensor 111, search processing for a partial region having high correlation with a face template under a predetermined condition can be completed in parallel during the period of read of all the pixels of the image sensor 111. In addition, immediately after the completion, face determination processing which is detailed determination processing in the image processing logic unit 120 can be performed. As a result, face detection processing in an object can be performed more efficiently.

According to the present exemplary embodiment, even when the read time for all the pixels of the image sensor 111 changes, it is possible to easily perform control for completing search processing for a partial region having high correlation with a face template within the time of read of all the pixels of the image sensor 111.

In the first and second exemplary embodiments, the row scanning circuit (control unit) 202a makes the transfer signal line (first control line) 212a output a signal based on an electric charge of the photodiode 301 to the column signal line (first signal line) 215a. The row scanning circuit (control unit) 202b makes the transfer signal line (second control line) 212b output a signal based on an electric charge of the photodiode 301 to the column signal line (second signal line) 215b. The specular reflection candidate region extracting unit 113 and the face candidate detecting unit 610 (and the face candidate normalizing unit 611) are first image processing units which perform first image processing for the signal output to the column signal line 215b. The development processing unit 122 is a second image processing unit which performs second image processing for the signal output to the column signal line 215a based on a result of the first image processing by the specular reflection candidate region extracting unit 113 or the face candidate detecting unit 610 (and the face candidate normalizing unit 611).

The row scanning circuit 202a makes the transfer signal line 212a output a signal based on the electric charge of the photodiodes 301 of all of the plurality of pixels 211 to the development processing unit 122. The row scanning circuit 202b makes the transfer signal line 212b output a signal based on the electric charge of the photodiodes 301 of a part of the plurality of pixels 211 to the specular reflection candidate region extracting unit 113 or the face candidate detecting unit 610. The specular reflection candidate region extracting unit 113 or the face candidate detecting unit 610 (and the face candidate normalizing unit 611) performs first image processing for the signal based on the electric charge of the photodiodes 301 of some of the pixels 211. The development processing unit 122 performs second image processing for a signal based on the electric charge of the photodiodes 301 of all of the pixels 211. The number of the pixels 211 output from the row scanning circuit 202b to the column signal line 215b via the transfer signal line 212b is smaller than that of the pixels 211 output from the row scanning circuit 202a to the column signal line 215a via the transfer signal line 212a.

The specular reflection candidate region extracting unit 113 or the face candidate detecting unit 610 (and the face candidate normalizing unit 611) completes the first image processing before the development processing unit 122 inputs all the signals of the pixel 211 output to the column signal line 215a.

The first image processing unit such as the specular reflection candidate region extracting unit 113 or the face candidate detecting unit 610 (and the face candidate normalizing unit 611) detects a predetermined image region. Specifically, the first image processing unit detects an image region including a specular reflection component on the surface of an object, an image region including a face of an object person, or an image region including a specified object. The first image processing unit outputs presence or absence of a predetermined image region, the number of the predetermined image region, and position information of the predetermined image region, or outputs an image signal of the predetermined image region. The development processing unit 122 performs second image processing for the image region detected by the first image processing unit.

The image processing system includes an imaging apparatus and an image processing apparatus. The imaging apparatus includes the image sensor 111, the row scanning circuits 202a and 202b, a first image processing unit, and a recording unit. The first image processing unit is the specular reflection candidate region extracting unit 113 or the face candidate detecting unit 610 (and the face candidate normalizing unit 611). The image processing apparatus includes the development processing unit 122. The recording unit records a signal of the column signal line 215a and a result of the first image processing in the first image processing unit. The development processing unit 122 performs second image processing for the signal of the column signal line 215a recoded in the recoding unit based on the result of the first image processing in the first image processing unit recoded in the recoding unit.

According to the first and second exemplary embodiments, the development processing unit 122 performs second image processing for the signal of the column signal line 215a based on the result of the first image processing in the first image processing unit. Particularly, the detection processing is performed in two steps. One of the steps is rough and high-speed detection processing by the specular reflection candidate region extracting unit 113 or the face candidate detecting unit 610, and the other is accurate detection processing with a large amount of processing by the specular reflection extracting unit 124 or the face determination unit 622. The development processing unit 122 can reduce a time lag generated by waiting for completion of the detection processing to reduce the total processing time.

Note that the above-described exemplary embodiments present only specific examples to implement the present invention. The technical scope of the present invention should not be construed as being limited by the exemplary embodiments. That is, the present invention can be implemented in various forms without deviating from the technical idea or the main characteristics thereof.

Other Exemplary Embodiments

Exemplary embodiments of the present invention can also be realized by a computer of a system or apparatus that reads out and executes computer executable instructions recorded on a storage medium (e.g., non-transitory computer-readable storage medium) to perform the functions of one or more of the above-described exemplary embodiment(s) of the present invention, and by a method performed by the computer of the system or apparatus by, for example, reading out and executing the computer executable instructions from the storage medium to perform the functions of one or more of the above-described exemplary embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075746, filed Apr. 1, 2014, which is hereby incorporated by reference herein in its entirety.

What is claimed is:

1. An imaging apparatus comprising:
   an image sensor including a plurality of pixels;
   a controller including a plurality of control lines to output signals from the pixels;
   a detector configured to detect a predetermined image region based on the signals; and
   an image processor,
   wherein
   each of the plurality of pixels includes a photoelectric converter configured to convert light into an electric charge and output a signal based on the electric charge,
   the controller includes a first control line to output the signal to a first signal line, and a second control line to output the signal to a second signal line,
   the detector is configured to detect the predetermined image region based on the signal output to the second signal line and output region information related to the predetermined image region, and
   the image processor performs image processing for the signal included in the predetermined image region detected by the detector output to the first signal line based on the region information, and wherein the detector is formed in a package different from a package including the image processor.

2. The imaging apparatus according to claim 1, wherein the image sensor, the controller, and the detector are formed in the same package.

3. The imaging apparatus according to claim 2, wherein the image sensor and the detector are stacked on each other and electrically connected to each other.

4. The imaging apparatus according to claim 1, wherein the number of the pixels output to the second signal line by the second control line is smaller than the number of pixels output to the first signal line by the first control line.

5. The imaging apparatus according to claim 4, wherein the detector completes the detecting processing before the image processor inputs all the signals for the pixels output to the first signal line.

6. The imaging apparatus according to claim 1, wherein the controller includes the first control line to output a signal based on the electric charge of the photoelectric conversion units of all the pixels to the processor, and the second control line to output a signal based on the electric charge of the photoelectric conversion units of a part of the plurality of pixels to the detector,
   the detector is configured to detect the signal based on the electric charge of the photoelectric conversion units of the part of the plurality of pixels, and
   the image processor is configured to perform the image processing for the signal based on the electric charge of the photoelectric conversion units of all the pixels.

7. The imaging apparatus according to claim 1, wherein the detector is configured to detect an image region including a specular reflection component on a surface of an object, an image region including a face of an object person, or an image region including a specified object.

8. The image processing system according to claim 1, wherein the image processing performs a development processing for the signal output to the first signal line.

9. The image apparatus according to claim 1, wherein the image processor performs a template matching processing for the signal output to the first signal line.

10. The imaging apparatus according to claim 1, wherein the detector detects the predetermined image region based on the brightness of the signal output to the second signal line.

11. The imaging apparatus according to claim 1, wherein the detector detects a plurality of the predetermined image region based on the signal output to the second signal line.

12. An image processing system comprising:
    an imaging apparatus including:
      an image sensor including a plurality of pixels;
      a controller including a plurality of control lines to output signals from the pixels;
      a detector configured to detect a predetermined region based on the signals;
      a recorder configured to record the signals; and
      an image processor configured to perform image processing for the signals,
    wherein
    each of the plurality of pixels includes a photoelectric converter configured to convert light into an electric charge and output a signal based on the electric charge,
    the controller includes a first control line to output the signal to a first signal line, and a second control line to output the signal to a second signal line,
    the detector is configured to detect the predetermined image region based on the signal output to the second signal line and output region information related to the predetermined image region as a result of detecting process in the detector,
    the recorder is configured to record a signal of the first signal line and the result of the detecting processing, and the image processor is configured to perform image processing for the signal of the first signal line recorded in the recorder, wherein the detector is formed in a package different from a package including the image processor.

13. The image processing system according to claim 12, wherein the signal of the first signal line recorded by the recorder is a moving image signal read periodically for image processing.

* * * * *